United States Patent Office 3,408,411
Patented Oct. 29, 1968

3,408,411
MANUFACTURE OF ORGANIC COMPOUNDS CONTAINING FLUORINE
Victor Conrad Richard McLoughlin, Farnborough, and John Thrower, Farnham, Surrey, England, assignors to Minister of Technology in Her Britannic Majesty's Government of the United Kingdom of Great Britain and Northern Ireland, London, England
No Drawing. Continuation-in-part of application Ser No. 550,892, May 18, 1966. This application July 21, 1967, Ser. No. 654,980
Claims priority, application Great Britain, May 21, 1965, 21,636/65
12 Claims. (Cl. 260—646)

ABSTRACT OF THE DISCLOSURE

Process for the manufacture of a fluorinated organic compound having an aromatic group directly connected to a fluorinated alkyl group, which comprises reacting an aromatic compound having a reactive nuclear halogeno-substituent, a fluorinated alkane having a reactive halogeno-substituent, and metallic copper in a dipolar aprotic organic solvent at between 60° and 200° C., and separating out the fluorinated compound formed by elimination of a reactive halogeno-substituent between the aromatic compound and the alkane.

---

This application is a continuation-in-part application to our application S.N. 550,892, filed May 18, 1966, now abandoned.

The present invention relates to the manufacture of organic compounds containing fluorine and is especially concerned with the manufacture of organic compounds having a fluorinated aliphatic group connected directly to an aromatic nucleus.

Fluorinated organic compounds having fluorine atoms in place of hydrogen atoms have various original and useful properites, often having greater chemical inertness, non-flammability and/or thermal stability over their non-fluorinated analogues. More particularly polyfluoroalkyl substituted aromatic compounds are useful as stable fluids, surface-active agents, oil-repellant coatings on surfaces, sealing agents, thermally and chemically stable alkyl-type resins and dyestuffs.

The basic object of the present invention is to provide a process for the manufacture of organic compounds having a fluorinated alkyl group connected directly to an aromatic nucleus in good yield and substantially free of isomers. A further particular object of the invention is to provide organic compounds having a fluorinated alkylene group connected between two aromatic nuclei. The organic compounds of both these types may advantageously have nuclear substituents by which they can be further reacted to form new and useful fluorinated organic compounds including polymers and modified polymers. Thus new compounds can be prepared which are useful as intermediates or polymer precursors for research or industrial purposes.

According to the invention, a process for the manufacture of a fluorinated organic compound having an aromatic group directly connected to a fluorinated alkyl group comprises reacting a compound containing an aromatic nucleus having a reactive halogeno-substituent, a fluorinated alkane having a reactive halogeno-substituent and metallic copper in a dipolar aprotic solvent, for example N,N-dimethylforamide, at between about 60° and 200° C. A reactive halogeno-substituent may be iodine, bromine or chlorine, iodine is generally preferred as it has the greatest reactant activity. Chlorine is the least active but has adequate reactivity in an activated aromatic environment, such as a triazine ring or when substituted in an ortho position to a nitro group in a benzene ring. Fluorine substituents are not normally sufficiently reactive to be of practical value and of course fluorine cannot be a reactive halogeno-substituent on a fluorinated alkane.

A fluorinated alkane as described in the specification normally has at least half of the possible sites of hydrogen atoms occupied by fluorine atoms, and fluoroalkyl compounds are preferred which contain the groups —$CF_2X$, —$CF_2CH_2X$ or —$CF(CF_3)X$ where X, the reactive halogeno substituent, is iodine or bromine. The aromatic-alkane coupling reaction generally proceeds more readily when the alkane is more highly fluorinated and contains preferably —$CF_2X$ and —$CF(CF_3)X$ and less preferably —$CF_2CH_2X$ groups.

By the reaction a copper halide is produced and a bond is formed between two carbon atoms to which reactive halogen atoms (which have been eliminated in formation of the copper halide) were previously attached, one of these carbon atoms being in an aromatic nucleus and the other in a fluorinated alkane. The resulting organic compounds, having a fluorinated alkyl group connected to an aromatic nucleus, include such compounds in which two aromatic nuclei are connected through a fluorinated alkylene group, if the fluorinated alkane is provided with two reactive halogeno-substituents. Thus, for example, compounds of type Ar—$R_f$ and Ar—$R_f'$—Ar can be produced where Ar represents an aromatic nucleus which may be substituted and $R_f$ and $R_f'$ represents fluorinated alkyl and flourinated alkylene groups respectively. When the reacting alkane is fully fluorinated, compounds having the formula $Ar(CF_2)_nAr$ and $Ar(CF_2)_{n-1}CF_3$ are produced, the preparation of compounds in which $n$ is at least 3 being particularly advantageous in comparison with other methods.

Reactions known as Ullmann reactions have been widely used to couple aromatic halides by means of metallic copper. Reported attempts to couple an aromatic halide with an aliphatic halide by means of metallic copper have not been successful; indicating that the self-coupling action of an aromatic halide is much more facile than the reaction between the aromatic halide and an aliphatic halide. Certain aromatic halides such as o-nitro-halogenobenzenes even self-couple at temperature as low as 60° C.

The present invention depends upon the surprising discovery that, a fluorinated, aliphatic halide will readily react with many aromatic halides when in a dipolar aprotic solvent at a temperature between 60° and 200° C., generally between 100° and 160° C. and under these conditions, this reaction unexpectedly takes place preferentially to the facile Ullmann aryl coupling reaction. An outstanding feature of the present process is that good yields of the fluorinated aralkyl compounds can be produced virtually free of bi-aryl compounds, the fluorinated aliphatic halide forming a soluble complex with the metallic copper when in a dipolar aprotic solvent with which the aromatic halide will react rather than self-couple.

In a process in accordance with the invention, an aromatic halide, a fluorinated alkyl halide and metallic copper are reacted together, and it is generally convenient for all three reactants to be reacted together from the commencement of the process. It may however, be advantageous for two of the three reactants to be brought together before the third reactant is introduced. In particular, it has been found that if the aromatic compound to be used is relatively unstable or is readily capable of self-coupling it is advantageous first to react the fluorinated alkyl halide with copper in an organic solvent before the aromatic halide is added. Although the alkane and copper can form a soluble complex it will be understood that any such process in which two reactants react in any way before the third is added is still a process in accordance with the invention provided the appropriate fluorinated aralkyl compound is produced.

Although processes as herein described may be carried out at between 60° and 200° C., for the majority of the reaction between the reacting aromatic and fluorinated alkyl halides temperatures between 100° and 160° C. are to be preferred and high yields of the order of 60% or more of the desired product may often be obtained. Dipolar aprotic solvents which may be used include dialkyl acylamides such as dimethyl and diethyl formamide, dimethyl and diethyl acetamide, dialkyl sulphoxides such as dimethyl sulphoxide, pyridines and quinolines including dialkyl substituted pyridines and quinolines, tetramethylene sulphone and hexamethyl phosphoramide. Pyridine is particularly effective at temperatures below 120° C. Aliphatic ethers have not been found to be effective solvents.

When iodine is used as the reactive halogeno-substituent on both the aromatic compound and aliphatic compound, especially when the aliphatic compound is otherwise fully fluorinated or substituted, the coupling reaction in accordance with the invention proceeds readily at temperatures between 110° and 130° C.

The metallic copper should be clean and in a finely divided form so that it has a large and effective reacting surface. One suitable form is mechanically pulverised copper which is commonly known as copper bronze.

The stoichiometry of the reaction is probably as shown in the following equation

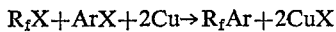

$$R_fX + ArX + 2Cu \rightarrow R_fAr + 2CuX$$

where $R_f$, Ar and X are as hitherto defined. It has been found desirable in order to obtain good yields based on the fluoroaliphatic halide to use excesses of the metallic copper and aromatic halide, preferably an excess of 50 to 150% of the copper over the fluoroaliphatic halide is used whereas a wider range of 5 to 250% of the aromatic halide has been found necessary.

It has also been found important for the reaction to be carried out in anhydrous conditions.

A compound containing an aromatic nucleus as described in this specification is a compound which contains a cyclic nucleus possessing a high resonance energy (of say at least 30 Kcal./mol) in which all the annular atoms take part in a single conjugated electronic system. Examples of such aromatic nuclei are six-membered carbocyclic or heterocyclic nuclei containing only carbon and nitrogen atoms.

The aromatic compound having a reactive halogeno-substituent may be a simple halogeno-substituted aromatic compound, for example, iodobenzene, iodopyridine or a chlorotriazine, or may be an aromatic compound having other substituent groups, which may be fluorine atoms, for example, m-iodo-nitrobenzene, m-iodotoluene, ethyl-m-iodobenzoate and pentafluorobromobenzene, and in general the substituent may be a lower alkoxy, nitro, lower acyloxy or a lower alkoxycarbonyl group, where each carbon-containing group has not more than 4 carbon atoms. The fluorinated alkane having a reactive halogeno-substituent may be a mono- or dihalogeno-substituted alkane having normally at least half and preferably all hydrogen atoms not replaced by iodine or bromine, replaced by fluorine (e.g. 1-iodo-pentadecafluoroheptane, 1-iodo-hepta-fluoropropane or 1,3-diiodo-hexafluoropropane); or alternatively the compound may be a fluoro-aliphatic compound containing other functional groups than the halogens (e.g. ethyl 4-iodo-hexafluoro-n-butanoate).

An important feature of the process in accordance with the invention is that it provides a route to a wide range of nuclear substituted aromatic compounds including many which cannot be made or can only be made with great difficulty by other processes, such as for example α,ω-di(hydroxyphenyl) perfluoroalkanes, α,ω-di(carboxyphenyl) perfluoroalkanes, and α,ω-bis(dicarboxyphenyl) perfluoroalkanes.

In general fluoroalkyl benzenes having lower alkyl, alkoxy, nitro, acyloxy and alkoxycarbonyl substituents can be produced by processes in accordance with the invention.

Typical examples of the manufacture of organic compounds in accordance with the invention will now be described.

A general procedure for producing these compounds from reactants which are not too volatile and which was used for producing the various 1,3-diarylhexafluoropropanes as described in Examples 7 to 15, and 21 to 24 was as follows:

Copper bronze was "activated" and dried by the standard "activation treatment" with iodine and then hydrochloric acid both in acetone followed by washing in acetone and drying, as described in "Practical Organic Chemistry," by A. I. Vogel, 2nd ed., p. 188. The solvent was dried, for example, by distilling from phosphorus pentoxide at reduced pressure. These two dry materials were stirred together in a dry flask equipped with a thermometer to measure the temperature of the contents, a condenser protected by a calcium chloride guard tube, and a nitrogen gas inlet. The flask was purged with nitrogen before the reactants, i.e. the aromatic halide and fluorinated alkane were added. A nitrogen atmosphere was maintained in the flask while the contents were heated on an oil bath at such a rate that the temperature of the bath rose at between 1° and 3° C. per minute. An exothermal reaction was generally observed between 100° and 120° C. when the internal flask temperature increased more rapidly than that of the oil bath. This temperature was maintained until the exotherm had subsided (5 to 30 minutes) after which the reaction mixture was heated at 120°–160° C. for up to 2.5 hours.

The reaction mixture was then filtered, the filtrate shaken with five times its volume of water and extracted with ether or methylene chloride. The organic phase was separated and twice washed with further amounts of water.

Finally the ether or methylene chloride solution was dried with MgSO₄ and distilled to give the required product.

If the reactants are volatile a modified process must be used as described for example, in Example 1.

If the reactants are relatively unreactive, the reaction may be carried out in a sealed vessel as described for example, in Example 3.

In relatively small scale experiments, as described in Examples 3, 4, 6 and 16 the distillates were separated by preparative scale gas-liquid chromatography (g.l.c.).

The products of the reaction were variously identified by their mass spectrum, each one having a breakdown pattern consistent with the proposed structure. Yield values are given in percentage by weight.

For the preparation of 1,3-diarylhexafluoropropanes, a ratio of reactants was used of 4–8 molar parts of aryl halide to 1 molar part of 1,3-diiodo-hexafluoropropane in the presence of 4–15 molar parts of activated copper. Between about 1 and 4 litres of a dipolar aprotic solvent, such as dimethylformamide, should be used for each mol of 1,3-diiodo-hexafluoropropane.

Example 1

Iodobenzene (15.5 g.), activated copper bronze (10.0 g.) and N,N-dimethylformamide (45 ml.) were stirred under reflux in a nitrogen atmosphere at 120° C. while 1-iodoheptafluoropropane (10.0 g.) in N,N-dimethylformamide (45 ml.) were stirred under reflux in a nitrogen atmosphere at 120° C. while 1-iodoheptafluoropropane (10.0 g.) in N,N-dimethylformamide (10 ml.) was added below the surface of the reaction mixture over a period of 60 minutes. The mixture was heated for a further 90 minutes before pouring into water (1 litre). The mixture was extracted with methylene chloride. The methylene chloride solution was dried (with MgSO$_4$) and fractionally distilled to give a 39% yield (3.25 g.) of 1-phenyl heptafluoropropane having a boiling point of 130–132° C.

Example 2

Iodobenzene (10.2 g.), ethyl 4-iodohexafluorobutanoate (3.5 g.), activated copper bronze (3.82 g.) and N,N-dimethylformamide (11 ml.) were mixed and stirred under reflux in a nitrogen atmosphere at 150°–155° C. for 1½ hours. The reaction mixture was cooled and filtered, and the filtrate shaken with water (100 ml.). The lower organic layer was separated, the aqueous phase extracted with ether (3× 30 ml.); the ether extracts and organic layer were combined, dried (with MgSO$_4$) and fractionally distilled to give a 45% yield of ethyl 4-phenylhexafluorobutanoate (1.6 g.) having a boiling point of 130–2° C. at 20 mm. Hg pressure.

Example 3

A mixture of 1-bromo-pentadecafluoroheptane $C_7F_{15}Br$ (4.5 g.), iodobenzene (8 g.), activated copper bronze (5 g.) and dimethylformamide (30 ml.) were heated in a sealed Pyrex glass tube at 185°–190° C. for 50 hours. The tube contents were then poured into a large volume of water, and the organic material extracted with chloroform. The chloroform extracts were distilled to remove most of the chloroform and the residue separated to give pentadecafluoroheptylbenzene ($C_7F_{15}C_6H_5$) in over 30% yield based on $C_7F_{15}Br$. Bromobenzene and biphenyl were also formed in the reaction.

Example 4

1-iodoheptafluoropropane (9.0 g.), o-chloronitrobenzene (9.0 g.), copper bronze (6.0 g.), and dimethyl formamide (15 ml.) were heated together in a sealed Pyrex glass tube at 175° C. for 14 hours. The reaction mixture was poured into water (200 ml.) and extracted with methylene chloride (50 ml.). The organic solution was distilled and the fraction having a boiling point of 120°–125° C. at 35 mm. Hg pressure was separated into nitrobenzene, o-chloronitrobenzene and o-heptafluoropropylnitrobenzene in 15–20% yield.

Example 5

Pentadecafluoro-1-iodoheptane (5.0 g.), activated copper bronze (4.0 g.) and dimethylformamide (15 ml.) were stirred and heated together to 96°–116° C. for 40 mins. The mixture was cooled rapidly to 20° C. and filtered in a closed apparatus to give a clear blue-green solution (about 12 ml.). A portion of this solution (about 8 ml.) and iodobenzene (1.0 g.) were heated together at 120°–140° C. for 1½ hours. After pouring into water and extraction with ether a portion was separated to give pentadecafluoroheptylbenzene ($C_7F_{15}C_6H_5$) and unreacted iodobenzene. The total yield of $C_7F_{15}C_6H_5$ was about 0.5 g. (23% based on $C_7F_{15}I$).

Example 6

1,1,1-trifluoro-2-iodoethane (11 g.), iodobenzene (24 g.), activated copper bronze (10 g.) and dimethylformamide (35 ml.) were sealed together under nitrogen in a Pyrex glass tube. The tube was heated at a temperature of up to 190° C. for 20 hours. The contents were treated with water (200 ml.) and methylene chloride (50 ml.). The organic solution was separated, dried and distilled. The fraction having a boiling point of 115°–120° C. was separated to give 2,2,2-trifluoroethylbenzene in 10–15% yield.

Example 7

Iodobenzene (306 g.), 1,3-diiodo-hexafluoropropane (82 g.), activated copper bronze (161 g.) and N,N-dimethylformamide (325 ml.) were stirred under reflux in a nitrogen atmosphere at 145°–155° C. for 3¼ hours. The reaction mixture was cooled and filtered, the filtrate shaken with water (3 l.) and the lower organic layer separated. The aqueous layer was ether extracted (2× 500 ml.), the extracts combined with the organic lower layer and the whole dried (with MgSO$_4$) and fractionally distilled to give a 60% yield of 1,3-diphenylhexafluoropropane (40 g.), having a boiling point of 133° C. at 5 mm. Hg pressure.

This prepartaion may also be performed with bromobenzene substituted for iodobenzene. The yield is then somewhat lower.

Example 8

3-iodopyridine (41 g.), 1,2-diiodo-hexafluoropropane (10 g.), and activated copper (20 g.) were reacted in 65 ml. of dimethylformamide for 1½ hours at 126° C. A 53% yield of 1,2-di(3-pyridyl)hexafluoropropane having a melting point of 63° was obtained.

Example 9 m-Iodotoluene (35 g.), 1,3-diodo-hexafluoropropane (10 g.) and activated copper (15 g.), were reacted in 40 ml. of dimethylformamide for 0.7 hour at 120° C. A 65% yield of 1,3-di-(m-tolyl)hexafluoropropane was obtained having a boiling point of 160°–162° C. at 18 mm. Hg pressure.

Example 10 m-Iodo-methoxybenzene (45 g.), 1,3-diiodo-hexafluoropropane (9.7 g.) and activated copper (20 g.) were reacted in 50 ml. of dimethylformamide for 2 hours at 140°–150° C. A 55% yield of 1,3-(m-methoxyphenyl) hexafluoropropane was obtained having a boiling point of 146°–150° C. at 0.2 mm. Hg. pressure.

Example 11 m-Iodo-nitrobenzene (21 g.), 1,3-diiodo-hexafluoropropane (6 g.) and activated copper (12 g.) were reacted in 20 ml. of dimethylformamide 1½ hours at 130°–135° C. A 50% yield of 1,3-(m-nitrophenyl) hexafluoropropane was obtained having a melting point of 86° C.

Example 12 m-Iodo-acetoxybenzene (325 g.), 1,3-diiodo-hexafluoropropane (100 g.) and activated copper (94 g.), were reacted in 920 ml. of dimethylformamide for 2 hours at 135° C. A 70% yield of 1,3-di(m-acetoxyphenyl) hexafluoropropane was obtained having a melting point of 58–9° C. and a boiling point of 140°–156° C. at 0.05 mm. Hg pressure.

Example 13 p-Iodo-acetoxybenzene (150 g.), 1-3-diiodo-hexafluoropropane (45 g.) and activated copper (54 g.) were reacted in 200 ml. of dimethylformamide for 2 hours at 120° C. A 65% yield of 1,3-di(p-acetoxyphenyl) hexafluoropropane was obtained having a melting point of 76–7° C. and a boiling point of 160°–165° C. at 0.03 mm. Hg pressure.

Example 14

Ethyl-m-iodobenzoate (552 g.), 1,3-diiodo-hexafluoropropane (152 g.) and activated copper (180 g.) were reacted in 625 ml. of dimethylformamide for 2 hours at 125° C. A 65% yield of 1,3-di(m-ethoxycarbonylphenyl)-hexafluoropropane was obtained having a boiling point of 149°–152° C. at 0.02 mm. Hg pressure.

Example 15

Methyl p-iodobenzoate (400 g.), 1,3-diiodo-hexafluoropropane (130 g.) and activated copper (164 g.) were reacted in 1,000 ml. of dimethylformamide for 2½ hours at 120° C. A 55% yield of 1,3-di-(p-methoxycarbonylphenyl)hexafluoropropane was obtained having a melting point of 130° C.

Example 16

Methyl p-bromobenzoate (20.1 g.), 1,3-diiodohexafluoropropane (6.2 g.), copper bronze (9.3 g.), and dimethylformamide (30 ml.) were sealed, under nitrogen, in a Pyrex glass tube. The tube was heated at 163° for 12 hours, cooled, and opened. The contents of the tube were shaken with water (3× 150 ml.) and chloroform (100 ml.). The chloroform solution was distilled, and parts of the distillate separate to give methyl benzoate, methyl-p-hexafluoropropylbenzoate, methyl - p-iodobenzoate, and 1,3 - di(p-methoxycarbonylphenyl) - hexafluoropropane (17% yield).

Example 17

2-chloro-4,6-dimethoxy-s-triazine (11.7 g.), activated copper bronze (5.5 g.), 1,3 - di-iodohexafluoropropane (4.5 g.) and dimethylformamide (40 ml.) were stirred and heated together at 110–120° C. for 2 hours. The mixture was poured into water, the solids filtered, dried and heated in vacuo to give at 130° C. an 0.2 mm. Hg pressure 2-hexafluoropropyl-4,6-dimethoxy-s-triazine, melting point 34°–38° C. (0.6 g., 20% yield). Further heating at 130°–160° C. and 0.2 mm. Hg pressure gave a tacky solid, 0.4 g., from which a small quantity (0.05 g., 1%) of 1,3 - bis(4,6-dimethoxy-s-triazinyl)hexafluoropropane, melting point 115°–118° C. was obtained.

Example 18

1,3-di(3-iodophenyl)hexafluoropropane (2.33 g.), activated copper bronze (2.4 g.) and N,N-dimethylformamide (8 ml.) were stirred and heated to 100° C. in a nitrogen atmosphere. 3 - phenylhexafluoro-1-iodopropane (3.70 g.) with dimethylformamide (3 ml.) were then added. The mixture was stirred and heated to 110°–120° C. for a total of 3.25 hours. The reaction mixture was filtered, the filtrate shaken with water (150 ml.), and the aqueous mixture extracted with ether. The ether solution was dried and evaporated to give a viscous oil (3.2 g.). Two short-path, vacuum evaporations at 160° C. gave 1,3-bis[3-(ω-phenylhexafluoropropyl)phenyl]-hexafluoropropane (1.35 g.).

Example 19

Iodobenzene (406 g.), 1,3 - di-iodohexafluoropropane (135 g.); activated copper bronze (147 g.) and N,N-dimethylacetamide (1050 ml.) were stirred together in a nitrogen atmosphere at 115–120° for 5 hours. A 72% yield of 1,3-diphenylhexafluoropropane was obtained.

Example 20

Iodobenzene (315 g.), 1,3 - di-iodohexafluoropropane (105 g.), activated copper bronze (111 g.) and 2,6-dimethylpyridine (750 ml.) were stirred together in a nitrogen atmosphere at 115–125° C. for 3 hours. A 42% yield of 1,3-diphenyl hexafluoropropane was obtained.

Example 21

1,3-di-iodo-hexafluoropropane (0.5 g.), iodobenzene (2 g.), and activated copper (1 g.) were stirred and heated under nitrogen in 2.0 ml. of tetramethylene sulphone for 2 hours at 155°–160° C. The reaction mixture was poured into water and the organic layer separated by gas-liquid chromatography to give a 5–10% yield of 1,3-diphenyl-hexafluoropropane.

Example 22

Iodobenzene (420 g.) 1,3 - di-iodohexafluoropropane (140 g.), activated copper bronze (146 g.) and hexamethylphosphoramide (1050 ml.) were stirred together in a nitrogen atmosphere at 115–125° C. for 17½ hours. A 58% yield of 1,3-diphenylhexafluoropropane was obtained.

Example 23

Iodobenzene (120 g.), 1,3 - di-iodohexafluoropropane (41 g.), activated copper bronze (42 g.), and dimethylsulphoxide (300 ml.) were stirred together in a nitrogen atmosphere at 115–125° C. for 2¼ hours. A 68% yield of 1,3-diphenylhexafluoropropane was obtained.

Example 24

Dimethyl 4 - iodophthalate (80 g.), 1,3-di-iodohexafluoropropane (20 g.), activated copper bronze (19 g.) and N,N-dimethylformamide (200 ml.) were stirred together in a nitrogen atmosphere at 120–125° C. for 3 to 4 hours. A 72% yield of 1,3-bis[3,4-di(methoxycarbonyl)phenyl]hexafluoropropane was obtained.

Example 25

α-Bromonaphthalene (16.6 g.), activated copper bronze (7.6 g.) and ethyl-4-iodohexafluorobutyrate (1.0 g.) were heated and stirred in a nitrogen atmosphere in a solution of hexamethylphosphoramide (30 ml.) at 160° C.

Ethyl-4-iodohexafluorobutyrate (7 g.) was then added slowly and the mixture stirred at 165° C. for 1½ hours. The mixture was filtered and the filtrate thoroughly washed and heated with dilute sodium hydroxide solution (30 ml. 10% strength) for 1 hour at 60° C. After extraction with methylene chloride, the alkaline solution was acidified with sulphuric acid. Extraction and distillation gave hexafluoro-4-(α-naphthyl)butyric acid (2.9 g.) in 39% yield.

Example 26

1-Bromo-2-methylnaphthalene (4.4 g., 0.02 mole), activated copper bronze (7.6 g., 0.12 g. atom) and hexamethylphosphoramide (30 ml.) were stirred and heated to 156° C. in a nitrogen atmosphere. Perfluoro-n-heptyl iodide (9.9 g., 0.02 mole) was then added dropwise during 15 mins. at 156–162° C. The mixture was then stirred at 150° C. for 2½ hours, cooled, and treated with water and methylene chloride. The methylene chloride solution was dried (MgSO$_4$), evaporated and the liquid product (5.0 g.) distilled, B.P. 88–126° at 0.25 mm. Hg. The oil obtained was separated into its three components by preparative scale gas-liquid chromatography giving: 1-(perfluoro - n-heptyl)-2-methylnaphthalene, a colourless oil, identified by mass spectrometry; unreacted 1 - bromo-2-methylnaphthalene; 1 - iodo - 2-methylnaphthalene. The yield of 1-(perfluoro-n-heptyl)-2-methylnaphthalene was determined by analytical gas-liquid chromatography as 45% based on the 1-bromo-2-methylnaphthalene consumed in the reaction.

Example 27

Iodobenzene (15.3 g.), activated copper bronze (17.0 g.), and N,N-dimethylformamide (50 ml.) were stirred together in a nitrogen atmosphere at 125° while 2-iodoheptafluoropropane (11.3 g.) in N,N-dimethylformamide (10 ml.) was added below the surface of the reaction mixture over a period of 15 minutes. The mixture was heated for a further 90 minutes at 125° C. before being poured into water (1 l.). The mixture was extracted with methylene chloride, the methylene chloride solution dried (with MgSO$_4$), and fractionally distilled to give 2-phenyl-heptafluoropropane (3.7 g., 40%), B.P. 120° C.

Example 28 m-Iodophenyl acetate (16.0 g.), activated copper bronze (8.5 g.), and N,N-dimethylformamide (50 ml.) were treated with 1-iodoheptafluoropropane (9.5 g.) in N,N-dimethylformamide (10 ml.) as in Example 27 to give 1 - (m-acetoxyphenyl) heptafluoropropane (6.3 g., 65%), B.P. 92–4° C./18 mm. Hg.

Example 29

Iodobenzene (15 g.), 1,3 - di-iodohexafluoropropane (5.0 g.), activated copper bronze (8.0 g.), and pyridine (20 ml.) were stirred and heated together in a nitrogen atmosphere at 89–92° for 100 minutes. The reaction mixture was poured into an excess of dilute hydrochloric acid and extracted with ether. The ether extracts were dried (with MgSO$_4$) and fractionally distilled to give 1,3-diphenylhexafluoropropane (1.5 g., 50%), B.P. 80°/0.1 mm. Hg.

Example 30

1,3-Di-iodohexafluoropropane (8.0 g.), activated copper bronze (8.0 g.) and pyridine (70 ml.) were heated together with stirring in a nitrogen atmosphere at 77–83° C. for 30 minutes. The mixture was cooled to room temperature before filtering the solution from the excess of copper and insoluble matter. The filtration was carried out under nitrogen. The solution was heated with 2-iodothiophen (8.0 g.) at 100° for 45 minutes. The reaction mixture was shaken with excess of dilute hydrochloric acid and ether, the ether layer dried ($MgSO_4$) and distilled to give 1,3 - bis(2-thienyl)hexafluoropropane (1.9 g., 30%).

We claim:

1. A process for the manufacture of a fluorinated organic compound having an aromatic group directly connected to a fluorinated alkyl group, which comprises reacting an aromatic compound having a reactive nuclear halogeno-substituent which is a member of the group consisting of iodine, bromine and chlorine, a fluorinated alkane having a reactive halogeno-substituent which is selected from the group consisting of bromine and iodine, and metallic copper in a dipolar aprotic solvent at between 60° and 200° C. and separating out the fluorinated compound formed by elimination of a reactive halogeno substituent from the aromatic compound and from the alkane.

2. A process according to claim 1 in which the said organic solvent is N,N-dimethylformamide, N,N-dimethylacetamide, dimethyl sulphoxide, hexamethyl phosphoramide and pyridine.

3. A process according to claim 1 in which the fluorinated alkane contains at least three carbon atoms.

4. A process according to claim 1 in which the fluorinated alkane is fully fluorinated apart from the reactive halogeno-substituent and any other substituent if present.

5. A process according to claim 1 in which the said organic solvent is pyridine and the reaction takes place between 60° and 120° C.

6. A process according to claim 1 in which the reaction takes place at between 100° and 160° C.

7. A process according to claim 1 in which each reactive halogeno-substituent is iodine.

8. A process according to claim 1 in which each reactive halogeno-substituent is bromine.

9. A process according to claim 1 in which said aromatic compound has at least one nuclear substituent in addition to a said reactive halogeno-substituent.

10. A process according to claim 9 in which the said substituent is selected from the group consisting of lower alkyl, lower alkoxy, nitro, lower acyloxy and a lower alkoxycarbonyl group, where each carbon-containing group contains not more than four carbon atoms.

11. A process according to claim 1 in which the said fluorinated alkane has two reactive halogeno-substituents on different carbon atoms and a fluorinated organic compound is formed having a fluorinated alkylene group directly connected between two aromatic groups.

12. A process according to claim 11 wherein the fluorinated alkylene group is fully fluorinated and has at least three carbon atoms.

References Cited

Pavlath et al.: Aromatic Fluorine Compounds, Reinhold Publishing Corp., New York, N.Y., 1962, p. 52.

Fanta: (1), Chemical Reviews, vol. 38, pp. 147 to 151 (1946).

Fanta: (2), Chemical Reviews, vol. 64, pp. 623 to 632 (1964).

Kornblum et al.: J. Am. Chem. Soc., vol. 74, p. 5782 (1952).

LELAND A. SEBASTIAN, *Primary Examiner.*